UNITED STATES PATENT OFFICE 2,069,132

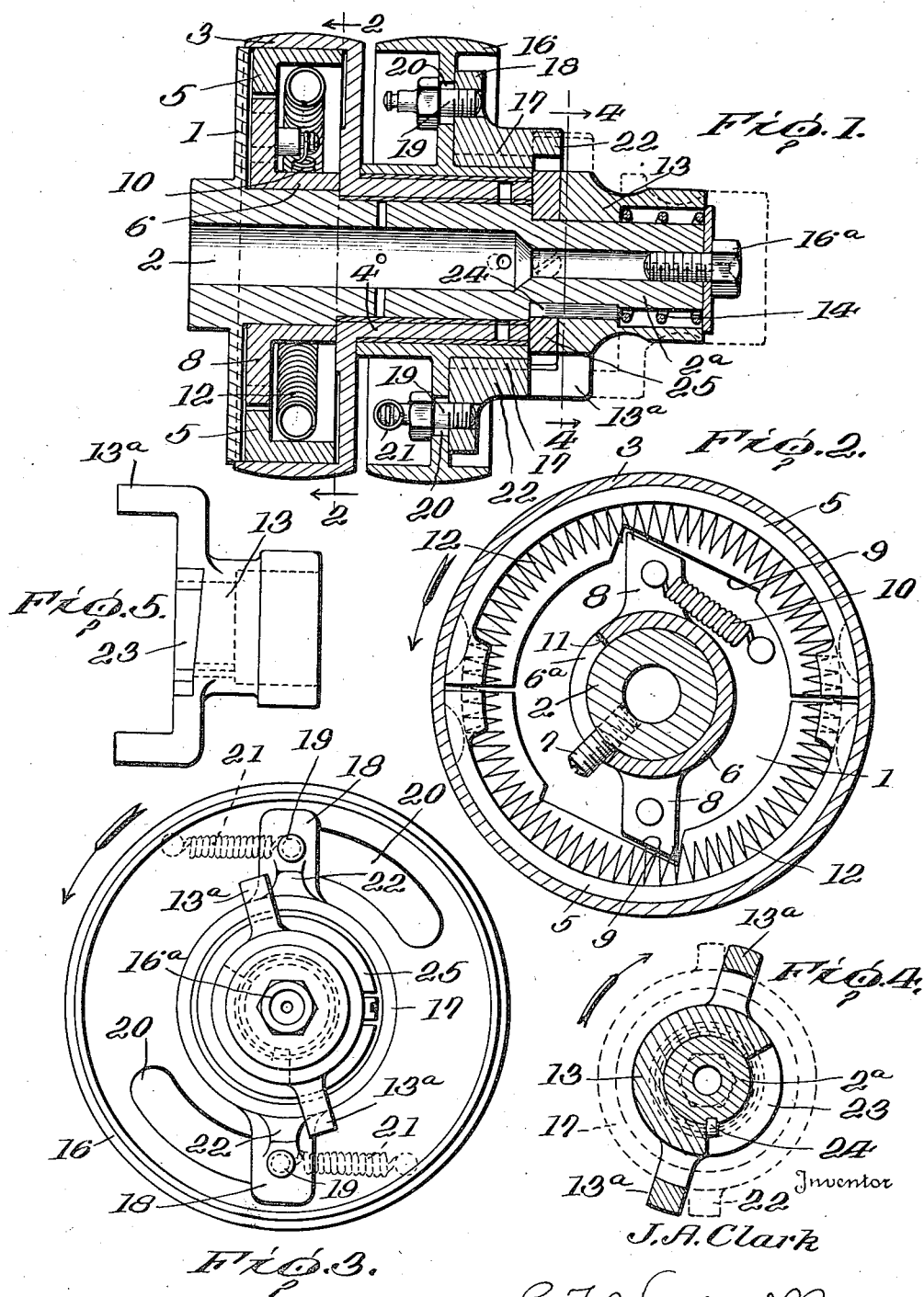

FRICTION AND DIRECT DRIVE COUPLING

James Arthur Clark, Ngaruawahia, New Zealand

Application August 28, 1934, Serial No. 741,837
In New Zealand October 18, 1933

2 Claims. (Cl. 192—55)

The invention relates to friction clutches of the type, wherein a driving connection is made between a driving member and a driven member, through the medium of centrifugally expanded shoes mounted on one of said members, being forced into frictional contact with the other of said members, and also wherein some cases a loose pulley is mounted on the aforesaid driving member.

The object of the present invention is to provide an improved form of clutch of the above mentioned type, said improved form being designed to avoid the necessity of using springs to bring about the initial friction required to set up the driving connection, and also where necessary or desirable, as for instance when the clutch is used in the transmission of driving power to cream separators and the like, to provide means for taking up or absorbing irregularities in the transmission.

A further object of the invention is to provide improvements in apparatus as above described, so that upon the driven machine such as a separator or the like being brought up to the required maximum speed, a non-slip yet shock absorbing driving connection can be established to ensure a positive and even drive to the machine being driven.

A clutch according to the invention, comprises a driving member and a member to be driven, the former having housed therein expanding shoes, which contain inclined slots or recesses, formed to receive shaped arms or projections drivably connected with the member to be driven.

In order to provide a non-slip yet shock absorbing driving connection between the driving member and the member to be driven for use when the latter has attained maximum speed, a loose pulley is mounted on the driving member, and is provided with means whereby it may be drivably connected to the member to be driven and utilized as the driving member, the means employed incorporating or being used in conjunction with means for absorbing or neutralizing shock or irregularities in the drive.

The improvements comprising the invention are illustrated in the accompanying drawing and in order that they may be clearly understood, will be particularly described in conjunction therewith.

In the drawing:—

Figure 1 is a longitudinal sectional elevation of the improved clutch,

Figure 2 a cross sectional view on the line 2—2 Figure 1,

Figure 3 an end view of the improved clutch,

Figure 4 a cross sectional view on the line 4—4 Figure 1 and

Figure 5 an elevation of the hand-grip used to lock the loose pulley to the member to be driven.

In the drawing, I is the member to be driven which in the form illustrated, comprises a disc having integral therewith a hollow shaft 2, capable of being made a fixture by approved means, to the shaft of a separator, or other apparatus, to be operated through the medium of the improved clutch.

The driving member 3 can comprise a belt pulley and is formed with a boss 4 fitted to turn on the shaft 2, said member 3 providing for shoes 5, a housing closed at one side by the disc or member I.

The shoes 5 of which there are preferably two, are shaped for accommodation around the inner side of the circular wall of the driving member 3, and are in light frictional contact in the latter, so as to be capable of outward movement or expansion under centrifugal force due to rotation of the driving member 3.

A collar or bush 6 on the shaft 2 of the disc I adjacent the latter, has limited turning movement on said shaft owing to a set-screw or stop 7 on the latter being entered in a slot 6a in said collar or bush 6, while a spring 10 acting between said disc I and one of opposed arms or projections 8 on said collar or bush 6, normally holds the latter so that the slot 6a therein is disposed at the side of the setscrew or stop 7, in the direction opposite the direction of turning of the driving member 3.

The shoes 5 housed in the driving member 3 have a width approximately equal to the width of the inner surface of the circular wall of the driving member 3 with which they are normally in frictional contact at their outer or driving surfaces, said shoes 5 also containing preferably in webs thereon inclined slots or recesses 9, which open through the inner edges of the shoes.

The arms or projections 8 on the collar or bush 6 aforesaid, are shaped to enter and for accommodation in the slots or recesses 9 in the shoes 5, and have limited movement in said slots or recesses.

Upon the driving member or pulley 3 rotating in the direction indicated by the arrow (Figure 2) friction between the member or pulley 3 and the shoes 5 is responsible for the latter turning with the member or pulley 3 and in doing so the inclined slots or recesses 9 in the shoes 5 cause the latter to ride on the shaped or inclined ends of the arms or projections 8 connected to the member 1 to be driven by the spring 10 and force the shoes 5 outwards, thereby increasing the friction between said shoes 5 and the member or pulley 3 prior to the latter commencing to take up the load, after which the shoes 5 increase their grip on the member or pulley 3 centrifugally.

During the starting up or running of the separator the spring connection 10 between the collar or bush 6 and the disc or driven member 1 absorbs or neutralizes any shocks, jars or irregularities in the transmission. The full drive takes place when the end 11 of the slot 6a engages the screw or stop 7.

Preferably a spring 12 is provided in the shoe housing to prevent chatter of the shoes 5 therein, but said spring 12 is not essential to the successful operation of the clutch.

In order to provide for a non-slip yet shock absorbing driving connection so as to ensure a positive and even drive to the machine being operated after the latter has been brought to full speed the shaft 2 of the member or disc 1 is extended and is formed with a reduced outer end 2a on which is sliaably mounted a circular hand grip 13 knurled or otherwise formed to facilitate it being gripped and operated, a spring 14 in compression in said hand grip 13 between the inner end thereof and a stop, such as a disc retained by a screw 16a on the end of the shaft 2 tending to force the hand grip 13 from the shaft end, or towards the loose pulley 16 on the boss 4 of the driving member or pulley 3.

The pulley 16 mounted on the boss 4 of the driving member 3 has surrounding its hub at the outer side of the pulley web, a ring or sleeve 17 with arms 18 thereon, from which projections such as screws 19 or the like, pass through slots 20 in the pulley web, and are connected to the latter by springs 21 in tension.

Also on the ring or sleeve 17 surrounding the hub of the pulley 16, are projections or stops 22 adapted to be engaged by the inwardly turned ends of arms 13a extending from the hand grip 13 aforesaid.

The hand grip 13 is slotted as at 23 to pass upon a key 24 secured in the reduced portion 2a of the shaft 2 on which it is slidable.

A distance collar 25 is secured on the shaft between the pulley hubs and the hand grip 13 to limit sliding movement of the latter under the action of its spring 14.

In starting up a separator or other machine equipped with the just described apparatus, the hand grip 13 is set against the action of its spring 14 so that its arms 13a with the inwardly turned ends, clear the projections or stops 22 on the ring or sleeve 17 surrounding the hub of the pulley 16, this being accomplished by drawing the hand grip 13 outwards along the reduced portion 2a of the shaft 2 until it is "off" the key 24 and by giving said hand grip 13 slight turning movement so that it will not pass upon the key 24.

Upon the separator or other machine being operated, attaining the required maximum speed through the driving member or pulley 3 containing the centrifugally expanded shoes 5, the pulley 16 on the boss 4 of the driving member or pulley 3 can be drivably connected to the shaft 2 of the member 1 by giving the hand grip 13 turning movement on the portion 2a of the shaft 2 until the slot 23 in said hand grip 13 comes opposite the key 24, enabling the spring 14 to act and move the hand grip 13 inwards so that the arms 13a thereon pass in front of the projections or stops 22 on the aforesaid ring or sleeve 17 when the latter is turned in the direction indicated by the arrows (Figures 2 and 3), so that by transferring the drive from the pulley 3 to the pulley 16, there is provided to the shaft 2 a non-slip or positive drive which at the same time is by reason of the spring connections between the arms 18 of the ring or sleeve 17 and the pulley 16, rendered shock absorbing.

In Figure 4 the arrow shows the direction in which the element 13a would be required to move in order to engage the key 24.

What I do claim and desire to obtain by Letters Patent of the United States of America is:—

1. A friction and direct drive coupling comprising a driving member, a driven member, friction shoes housed within said driving member, a collar loosely mounted on said driven member and a spring drivably connecting said collar with said driven member and spreader arms upon said collar for expanding said friction shoes into driving contact with said driving member.

2. A friction and direct drive coupling comprising a driving member, a driven member, friction shoes housed within said driving member, an abutment upon said driven member, a collar loosely mounted on said driven member and having a slot in which said abutment is disposed, spreader arms on said collar, springs connecting said spreader arms with said driven member and said spreader arms coacting with said friction shoes for expanding said friction shoes into driving contact with said driving member.

JAMES ARTHUR CLARK.